United States Patent [19]

Tominaga et al.

[11] 4,214,827
[45] Jul. 29, 1980

[54] AUTOMATIC FOCUS CONTROL CAMERA

[75] Inventors: Shinji Tominaga; Toshinori Imura; Seiji Yamada, all of Sakai; Yasuzi Kogure, Kawanishi, all of Japan

[73] Assignee: Minolta Camera Kabushiki Kaisha, Osaka, Japan

[21] Appl. No.: 961,505

[22] Filed: Nov. 17, 1978

[30] Foreign Application Priority Data

Nov. 22, 1977 [JP] Japan .................................. 52-140180

[51] Int. Cl.² .................... G03B 13/20; G03B 15/05; G03B 17/38
[52] U.S. Cl. ................................... 354/127; 354/195; 354/268
[58] Field of Search ...................... 354/25, 27, 32–34, 354/60 R, 60 A, 60 F, 127, 128, 139, 145, 149, 234, 268, 195, 235; 352/140

[56] References Cited

U.S. PATENT DOCUMENTS

| 3,917,395 | 11/1975 | Ogawa | 354/25 X |
| 4,099,192 | 7/1978 | Aizawa et al. | 354/234 |
| 4,126,877 | 11/1978 | Ohtaki et al. | 354/149 |

Primary Examiner—L. T. Hix
Assistant Examiner—William B. Perkey
Attorney, Agent, or Firm—Wenderoth, Lind & Ponack

[57] ABSTRACT

An automatic focus control camera which includes automatic exposure control means, automatic focus adjusting means, and flash means. These three means are arranged to have a power source in common, and furthermore, the automatic focus adjusting means and flash means are supplied with electric power through an electric voltage boosting circuit which is arranged not to function during an exposure period for taking photographs. Moreover, an electric voltage checking circuit is included for checking a voltage supplied to the automatic focus adjusting means so that the shutter can not be released unless the voltage reaches a predetermined level.

10 Claims, 3 Drawing Figures

AUTOMATIC FOCUS CONTROL CAMERA

BACKGROUND OF THE INVENTION

The present invention relates to a camera, and more particularly, to a camera provided with automatic focus adjusting means.

The conventional cameras of the above described type, however, have a disadvantages because they can be actuated in response to confirm before depression of the shutter release button, whether the power source voltage is sufficiently high enough for correctly driving in succession the automatic focus adjusting means and the shutter releasing mechanism or not. There is a possibility that these cameras may be operated with an insufficient power source voltage, thus resulting in faulty photographs taken with incorrect focus.

Further, following the recent trend to facilitate the operation of cameras, automatic focus control cameras equipped with automatic exposure control means and also equipped with flash means such as an electronic flash or the like incorporated therein have been proposed for enabling even those unskilled in photography to readily take photographs without failure under various light conditions.

Consequently, if a camera is further improved in a manner so that actuation of the shutter release can not be brought about so long as the power source level of the automatic focus adjusting means is not high enough, these cameras would be quite handy for beginners.

SUMMARY OF THE INVENTION

Accordingly, an essential object of the present invention is to provide an automatic focus control camera in which the shutter is arranged to be released only when the power source voltage is sufficiently high for correctly driving the automatic focus adjusting means.

Another important object of the present invention is to provide an automatic focus control camera of the above-described type, wherein the power source voltage for driving the automatic focus adjusting means is checked through a voltage checking circuit, so that the objective lens driving mechanism can not be released so long as the voltage mentioned above is lower than a predetermined voltage level.

A further object of the present invention is to provide an automatic focus control camera of the abovedescribed type, wherein the power source voltage applied to the flash means is also checked through the voltage checking circuit for the automatic focus adjusting means, so that the shutter can not be released if either the power source voltage for actuation of the automatic focus adjusting means or the power source voltage for actuation of the flash means is lower than a corresponding predetermined level.

A still further object of the present invention is to provide an automatic focus control camera of the above-described type which is simple in construction and accurate in function, and which can be produced at low cost.

Another object of the present invention is to provide an automatic focus control camera of the abovedescribed type, which is arranged so that the shutter release can be effected only when the conditions for causing the camera to function normally are fully met, both in photographing with the use of a flash and in shooting under natural light condition without the use of a flash, to enable even those unskilled in handling cameras to readily take photographic pictures through mere depression of the shutter release button.

According to the preferred embodiment of the present invention, there is provided an automatic focus control camera which comprises a camera objective lens, driving means for driving this objective lens along the optical axis thereof to change the focusing of this lens, distance detecting means for generating a distance signal representative of the distance from the camera to an object to be photographed, arresting means for arresting the operation of the driving means and setting the axial position of the objective lens in accordance with the distance signal, a camera shutter mechanism, shutter release means operable in association with the operation of the driving means for actuating the camera shutter mechanism subsequent to the position setting of the objective lens, actuating means for actuating the driving means, power supply means for supplying electric power to at least the distance detecting means, voltage checker means for generating a first output signal when the voltage of the power supply means is higher than a given level, manual member for generating a second output signal in response to the manual operation thereof, and gate means responsive to the first and second output signals for allowing the transmission of the distance signal from the distance detecting means to the arresting means and for actuating the actuation means.

According to another preferred embodiment of the present invention, there is provided an automatic focus control camera which comprises automatic exposure control means, automatic focus adjusting means including an automatic rangefinder and an objective lens driving mechanism, and flash means. These three means mentioned above are arranged to have a common electric power source, common and furthermore, the automatic focus adjusting means together with the flash means are supplied with electric power through an electric voltage boosting circuit, while electric voltage boosting function of the electric voltage boosting circuit is interrupted during exposure for taking a photographic picture.

Furthermore, an electric voltage checking circuit is provided for checking the electric voltage applied to the automatic focus adjusting means and is associated with the shutter releasing mechanism so that the shutter releasing mechanism can not be actuated, so long as the level of the electric voltage mentioned above is less than a predetermined level. Moreover, in addition to the circuit characteristics described in the foregoing, the checking of the electric voltage supplies for the flash means as well as for the automatic focus adjusting means may be accomplished by the same electric voltage checking circuit. In the arrangement of the present invention as described above, the shutter can be released only when the power source voltage applied to the automatic focus adjusting means is at or above a predetermined level irrespective of whether the flash means is used for taking photographs or not, whereby the photographer may operate the camera without paying attention to the power source voltage. Thus, disadvantages inherent in the conventional automatic focus control cameras of this kind are substantially eliminated.

BRIEF DESCRIPTION OF THE DRAWINGS

These and other objects and features of the present invention will become apparent from the following description of the preferred embodiment thereof with reference to the accompanying drawings in which.

Before the description of the present invention proceeds, note that like parts are designated by like reference numerals throughout the several views of the accompanying drawings.

DETAILED DESCRIPTION OF THE INVENTION

Although not particularly described hereinbelow, a photographic camera to which the concept of the present invention is applied is understood as including, as its principal components: an objective lens assembly, which may be constituted by one or more lens elements; a focal plane where a light sensitive film is located; a shutter cocking or charging mechanism for placing the shutter mechanism in a cocked or charged position ready for actually taking photographic pictures, the shutter cocking or charging mechanism being generally associated with a manipulative film advancing lever so that, upon completion of movement of the film advancing lever to advance the light sensitive film from one frame to another past the position where exposure of the film takes place, the shutter mechanism can be set in the cocked or charged position; a viewfinder arrangement through which the camera is aimed at a target object to be photographed; and a shutter release button which, when depressed, releases the shutter mechanism from the cocked or charged position to achieve the exposure of the film.

All of these principal components of the photographic camera as well as their operative relationships are known to those skilled in the art, and, therefore, the details thereof are herein omitted for the sake of brevity. However, in accordance with the present invention, the photographic camera of the type referred to above further includes an automatic focus adjusting means, an automatic exposure control means, and a flash means, all of which will now be described with reference to the accompanying drawings.

Figure 1:
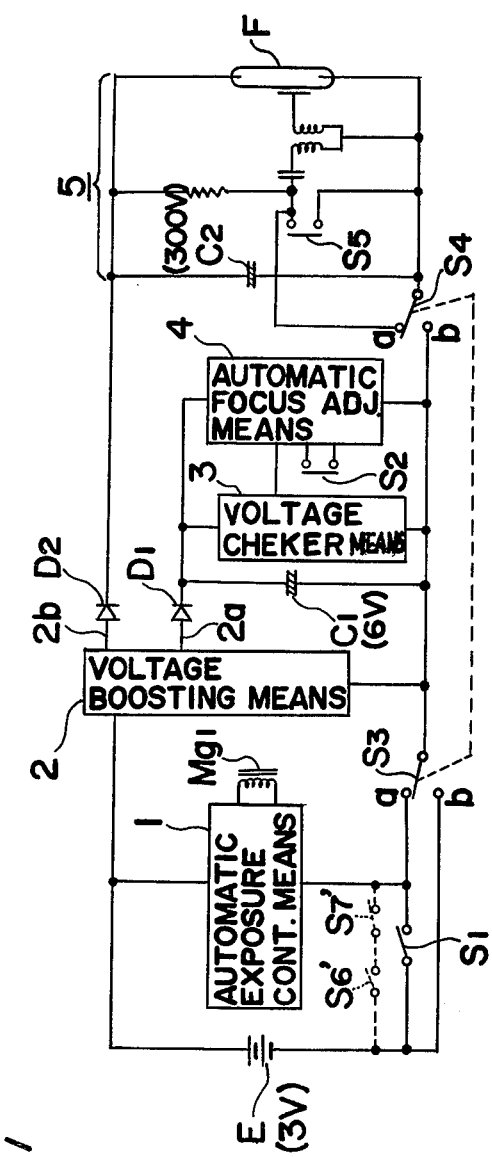
FIG. 1 is an electrical block diagram showing the basic construction of an automatic focus control camera according to one preferred embodiment of the present invention.

Referring now to FIG. 1, there is shown a camera control circuit according to the present invention, which comprises an automatic focus adjusting means 4, an automatic exposure control means 1, and a flash means 5 such as an electronic flash or the like. According to the present invention, as is clear from FIGS. 1 and 2 and as and will be specifically described hereinbelow, these three means mentioned above are arranged to have electric power source E in common, and furthermore, the automatic focus adjusting means 4 and the flash means 5 are supplied with predetermined voltages through a voltage boosting circuit 2, and the voltage boosting function of the voltage boosting circuit 2 mentioned above is suspended during the exposure period accompanying the taking a photographic picture.

Furthermore, a voltage checking circuit or a voltage checker means 3 is provided for checking the level of the voltage which is applied to the automatic focus adjusting means 4. The voltage checking circuit 3 is associated with the shutter release mechanism through the focus adjusting means 4 to enable shutter release, provided that the voltage applied to the automatic focus adjusting means 4 or, more particularly, the electric voltage detected by the voltage checking circuit 3 is greater than a predetermined level. With the voltage checking circuit 3 as described above, the checking of the respective levels of the electric power supplies for the automatic focus adjusting means 4 as well as for the flash means 5 can be accomplished by the same circuit 3 mentioned above.

More specific description of the present invention will be given hereinbelow.

As is specifically shown in FIG. 1, electric battery cells E, each having a voltage of 1.5 V and being interconnected in series, are employed in the circuit of the figure to generate a voltage of 3 V. The automatic exposure control means 1 may be of a conventional type comprising, for example, light receiving elements, a capacitor for photo-electric current integration, a Schmidt trigger circuit, and an electromagnet to control the shutter mechanism. The control means 1 may further include a brightness detecting circuit, which detects whether the brightness of an object to be photographed or scene brightness is above or below the limit of the blur occurring range, e.g., the range of shutter speeds below a certain value, for example, one-thirtieth second, which will cause blurring in a picture taken with the camera supported by hand.

The electric voltage boosting circuit 2 includes an oscillating circuit, a step-up transformer, etc., to step up the voltage of the cells E to obtain voltages higher than that of the cells E.

In FIG. 1, the secondary coil of the step-up transformer $T_1$ has output terminals $2a$ and $2b$ for generating thereat AC outputs, for example, of 6 V at the terminal $2a$ and 300 V at the terminal $2b$, which outputs are rectified into DC outputs through diodes $D_1$ and $D_2$ respectively coupled to the terminals $2a$ and $2b$ thereby charging corresponding capacitors $C_1$ and $C_2$ further connected to said diodes $D_1$ and $D_2$ as shown.

As described in the foregoing, the terminal voltage of the capacitor $C_1$ is, for example, 6 V, which is supplied to the automatic focus adjusting means 4, while the terminal voltage of the capacitor $C_2$, for example, of 300 V mentioned above is supplied to the flash means 5 to provide energy for energizing its flash tube. The electric voltage checking circuit 3 is connected in parallel with the capacitor $C_1$ which in turn energizes the automatic focus adjusting means 4, and is arranged to check whether the charging voltage of the capacitor $C_1$ is high enough to permit the automatic focus adjusting means 4 to function normally, and if not, generates a signal for inhibiting the function of the automatic focus adjusting means and the subsequent camera exposure operation, even when the shutter release signal is given. When electric switch $S_2$ is closed, and the predetermined voltage is normally applied to the automatic focus adjusting means 4 the predetermined voltage, the automatic focus adjusting means 4 adjusts the objective lens assembly in FIG. 3 to bring it to a position corresponding to the distance of the object to be photographed in a known manner. The flash circuit 5 includes a flash tube F and a trigger circuit to electrically trigger the flash tube F upon closure of the synchro switch $S_5$, so that the discharging tube F emits flash light. The circuit of FIG. 1 further includes a power source switch $S_1$ to be closed in the initial stage of depression of the shutter release button, and switches $S_3$ and $S_4$ which are connected to the respective contacts a when the photographic picture is taken without the flash, while the switches $S_3$ and $S_4$ are changed over to the respective contacts b when the photographic picture is to be taken with the flash.

Note here that the circuits of FIG. 1 may be modified in such a manner that the flash means is supplied with electric power from a separate power source, and that the voltage boosting circuit is omitted with the necessary electric power supplied to automatic focus adjusting means 4 directly from the power source E.

Subsequently, the function of the circuit of FIG. 1 will be described in detail hereinbelow.

On the assumption that the switches $S_3$ and $S_4$ mentioned above are both connected to the respective contacts a and therefore, the electric circuit of the present invention is ready for taking pictures without the help of the flash, when the switch $S_1$ is closed by the depression of the shutter release button, the automatic exposure control circuit 1 and the voltage boosting circuit 2 are supplied with the power source voltage.

In the above state, the capacitor $C_2$ is not electrically charged, because the switch $S_4$ is connected to the contact a, while the capacitor $C_1$ is electrically charged to a predetermined voltage level within a relatively short period of time, since the electric load applied to the electric voltage boosting circuit 2 is small. Subsequent to the closure of the switch $S_1$, when the shutter release button is further depressed by the photographer who has confirmed, for example, that the shutter speed corresponding to the scene brightness detected is in an available range or in a range outside of the blur occurring range, the switch $S_2$ is closed. Therefore, if the electric voltage of the capacitor $C_1$ has reached the predetermined level at the moment when the shutter release button is fully depressed, the automatic focus adjusting means 4 is actuated to move the objective lens assembly to a properly focused position and thereby, soon after the positioning of the objective lens assembly is completed, the shutter is opened and control of the exposure time is started.

In the above structure, even if the switches $S_1$ and $S_2$ are both closed almost at the same time by the sudden full stroke depression of the shutter release button, without the moderate actuation thereof, the insufficiently high level of the electric voltage of the capacitor $C_1$ as compared with the predetermined level thereof is first detected by the electric voltage checking circuit 3 mentioned above and thereby, the automatic focus adjusting means 4 is maintained in a non-operational state, until the capacitor $C_1$ is fully charged up to the predetermined level. As described in the foregoing, when the capacitor $C_1$ is fully electrically charged up to the predetermined level, the actuation of the automatic focus adjusting means 4 and the subsequent working actuation of the automatic exposure control means 1 are accomplished in succession.

When the photographic picture are to be taken with the help of the flash, the switches $S_3$ and $S_4$ are changed over to the respective contacts b, whereby the voltage boosting circuit 2 is directly connected to the cells E and electrical charging of both of the capacitors $C_1$ and $C_2$ is begun as well, even if the switch $S_1$ is not closed. Note here that since the predetermined electrical charge level for the capacitor $C_2$ is quite high, the electric voltage produced from the voltage boosting circuit 2 has a tendency to decrease and thus, the capacitor $C_1$ is not electrically charged to the predetermined voltage level, for example, of 6 V, until the charge in the capacitor $C_2$ reaches the predetermined level, for example, of 300 V.

In other word, in the circuit arrangement mentioned above, the checking of the electric voltage level of the capacitor $C_1$ with reference to the predetermined value simultaneously checks the voltage of the capacitor $C_2$. Therefore, if the switch $S_2$ is closed without the capacitor $C_2$ being fully charged, the actuation of neither the automatic focus mechanism, nor the subsequent actuation of the exposure mechanism is accomplished. As soon as the capacitor $C_2$ is fully charged, the camera equipped with the circuit arrangement of the present invention becomes ready to release the shutter releasing mechanism and thereby prepared for the successive series of steps for taking photographic pictures when the switches $S_1$ and $S_2$ are successively closed.

In connection with the above circuit arrangement, according to the present invention, there is further provided means (not shown in FIG. 1) for short-circuiting the base and emitter of an oscillation transistor (not shown in FIG. 1) incorporated in an oscillating circuit which constitutes a part of the voltage boosting circuit 2 mentioned above, so that the boosting function by the voltage boosting circuit 2 is not actuated when the shutter is opened.

The specific arrangement to place the boosting means into an inoperative condition during the period of exposure as described in the foregoing is essential, if the precise performance of the automatic exposure control circuit mentioned above is desired. The reason for preparing the arrangement as described above is due to the fact that the voltage of the cells E tends to be unstable, during the time the large capacitor $C_2$ having a large capacity is being charged to an extremely high voltage, thus it is impossible to maintain correct functioning of the exposure control circuit during that period. Therefore, the function of the voltage boosting circuit 2 is suspended during the exposure period. Upon completion of the exposure, the function of the voltage boosting circuit is resumed.

Figure 2:
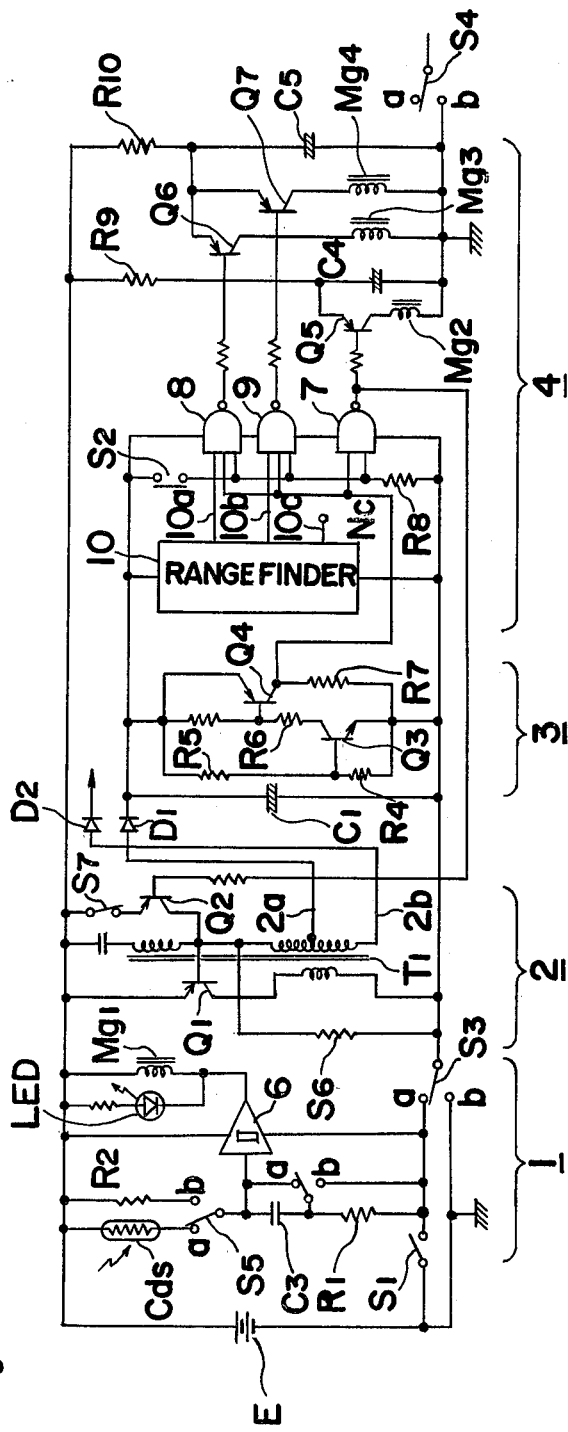
FIG. 2 is a diagram similar to FIG. 1, but which partially and particularly shows the circuit-connections of various electric and electronic elements employed in the embodiment of FIG. 1.

In FIG. 2, there is shown a specific circuit diagram, which constitutes the main portion of one embodiment of the present invention. The automatic exposure control circuit 1 illustrated in FIG. 2, includes a switching circuit 6, for example, a Schmidt circuit or the like, and a resistor $R_1$ which together with a photoconductive element CdS constitute a voltage dividing circuit to generate a signal indicating the brightness of the object to be photographed. When taking photographic pictures with the help of the flash, switch $S_5$ as well as switches $S_3$ and $S_4$ are connected to the respective contacts b, so that resistor $R_2$ and capacitor $C_3$ constitute a time constant circuit to provide a shutter speed of, for example, 1/60 second, synchronized with the flash firing. A switch $S_6$ is connected to its contact a to form an object brightness detecting circuit before the shutter is opened, and is changed over to its contact b to form the time constant circuit as soon as the shutter is opened. A light emitting diode (LED) is connected to the output of the switching circuit 6 to warn of the possible occurrence of bluring described earlier.

The voltage boosting circuit 2 includes an oscillation transistor $Q_1$ and a switching transistor $Q_2$ for short-circuiting the connection between the base and emitter of the transistor $Q_1$ when the switching transistor $Q_2$ is rendered conductive, so that the oscillation generated by the transistor $Q_1$ may be interrupted. Furthermore, a switch $S_7$ connected to the emitter of the transistor $Q_2$ is opened when the shutter is closed, and closed when the shutter mechanism is cocked or brought into a charged state by the operation of the film advancing lever.

The voltage checking circuit 3 includes transistors $Q_3$ and $Q_4$, and resistors $R_4$ to $R_7$. The collector voltage of the transistor $Q_4$ is a high level, when the voltage level of the capacitor $C_1$ is higher than the predetermined value. The collector of the transistor $Q_4$ is connected to respective input terminals of NAND gates 7, 8 and 9. An object distance detecting means or a rangefinder means 10 detects the zonal distance of the target object to be photographed so as to produce a high level output signal from one of the three output terminals 10a, 10b and 10c, the zonal distance mentioned above being classified into either a far zonal distance, an intermediate zonal distance, or a near zonal distance, respectively. The rangefinder means 10 as described above has already been disclosed in Japanese Laid Open Patent Application, Tokkaisho No. 50-138825 and reference should be made thereto for the details thereof. The output terminals 10a and 10b are electrically connected to one of the input terminals of the gates 8 and 9 mentioned above. The other input terminals of the gates 7, 8 and 9 are respectively connected to a line which interconnects the switch $S_2$ and the resistor $R_8$ as specifically shown in FIG. 2. The output terminals of the gates 7, 8 and 9 are respectively connected to the bases of transistors $Q_5$, $Q_6$ and $Q_7$ through respective resistors. The electromagnets Mg2, Mg3, and Mg4 are connected to respective collectors of the transistors $Q_5$, $Q_6$ and $Q_7$, and each has a permanent magnet core. Each one of the permanent magnets mentioned above normally attracts a movable member corresponding to that electromagnet so as to hold it, until an electric current flows through the coil of that electromagnet. The electric current mentioned above flows through one of the coils into either of the capacitors $C_4$ or $C_5$ when the corresponding transistor $Q_5$, $Q_6$ or $Q_7$ is rendered conductive and then, the electric charge already charged in the capacitors mentioned above by means of resistors $R_9$ and $R_{10}$ is subsequently discharged. The electromagnet denoted Mg2 is provided for releasing the cocking of the objective lens driving mechanism, while electromagnets Mg3 and Mg4 are provided for adjusting the axial position of the objective lens assembly as will be specifically described hereinbelow.

Figure 3:
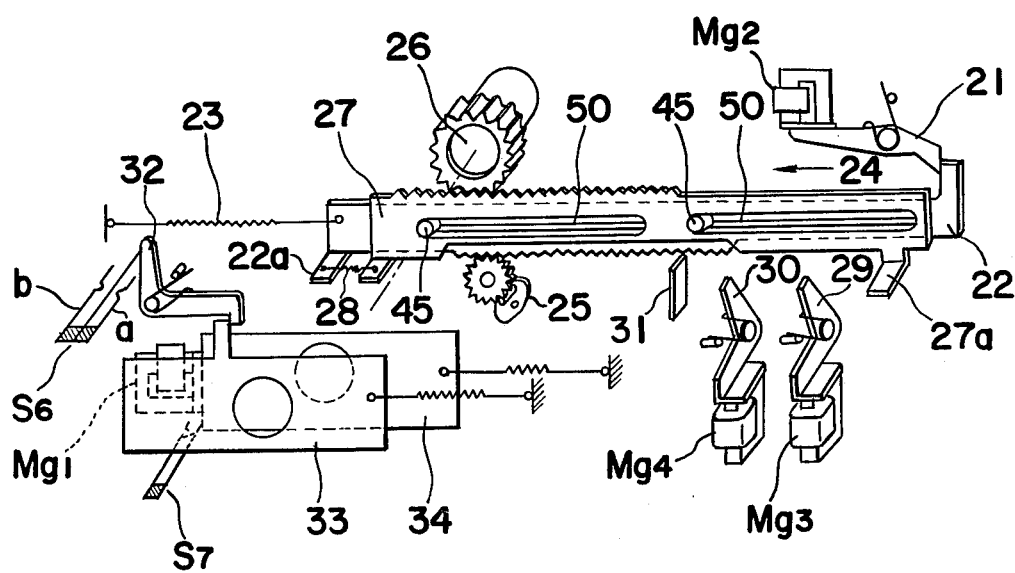
FIG. 3 is a partial perspective view particularly showing the mechanical construction mainly concerning the automatic focus adjusting means together with the shutter releasing mechanism employed in the embodiment of FIG. 1.

More specific functional characteristics of the circuit shown in FIG. 2 will become apparent from the following description taken in conjunction with the mechanical arrangement of one preferred embodiment thereof with reference to FIG. 3.

In the case of taking photographic pictures without the help of the flash, depression of the shutter release button successively closes the switches $S_1$ and $S_2$ in the circuit mentioned in the foregoing to initiate the camera operation. Subsequently, when a high level voltage is produced at the collector of the transistor $Q_4$ by means of the electric voltage checking circuit 3, the output of the NAND gate 7 is rendered a low level, and thereby, the transistor $Q_5$ is rendered conductive to energize the coil of the electromagnet Mg2 and to release a movable member or a holding lever 21. Then, the holding lever 21, which is urged counterclockwise by a spring, is pivotally moved counterclockwise with respect to the pivotal center thereof with the other end portion disengaging from a projecting portion of an elongated operating member 22. As the result of the disengagement, the operating member 22, which had been cocked against a spring 23 connected to one end of the member begins to move in the leftward direction as indicated by an arrow 24 in FIG. 3. However, the moving speed of the member 22 is properly controlled by a governor 25.

Furthermore, as illustrated in FIG. 3, a lens driving member 27 is further provided for driving an object lens assembly 26 through a rack and gear arrangement, and a laterally projecting end of the member 27 is resiliently by a spring 28 to a projection 22a provided at one end of the operating member 22. Therefore, following the movement of the operating member 22, the lens driving member 27 is also transferred. Moreover, the member 27 and the member 22 are guided by respective arrangements of stud or pin 45 fixed on the camera body and grooves 50 formed in the members 27 and 22.

When the object to be photographed is located within the near zonal distance which is described earlier, a high level signal is produced from the output terminal 10a of the rangefinder 10, and thereby, the output of the gate 8 mentioned above is rendered a low level. Hence, the transistor $Q_6$ is rendered conductive to energize the coil of the electromagnet Mg3. As the result, the holding lever 29 associated with the electromagnet Mg3 is released from the attractive force produced by the permanent magnet core of the electromagnet Mg3, whereby the lever 29 is pivotally moved and stops the lens driving member 27. More specifically, the lever 29 is pivotally moved into the path of a laterally extending portion 27a provided at a tailing portion of the member 27 and is engaged by the portion 27a, whereby the movement of the member 27 together with the objective lens assembly is halted and the objective lens assembly 26 is appropriately positioned so as to be focused on the object located in the near zonal distance mentioned earlier.

However, the operating member 22 itself keeps moving until the laterally extending member 22a engages an operational lever 32. The operational lever 32 normally holds the shutter in the closed state through a latch engagement with a portion of the shutter. Furthermore, as is seen from FIG. 3, the switch $S_6$ is relatively positioned to be changed over from the contact a to the contact b by the operational lever 32. Therefore, when the laterally extending member 22a drives the operational lever 32 counterclockwise, not only is the shutter opening member 33 released and thereby, started shifting, but also the switch $S_6$ is changed over to the contact b.

Next, as is seen from FIG. 2, the measurement of the exposure time is begun and the excitation of the electromagnet Mg1 is interrupted after a predetermined time-lag, whereby a shutter closing member 34 attracted by the electromagnet Mg1 and positioned behind the shutter opening member 33 is released to move by means of the force of a spring and thereby terminate the exposure.

Upon the movement of the shutter closing member 34, the switch $S_7$, which is maintained in a closed state by the tailing portion of the shutter closing member 34, is opened. Accordingly, the transistor $Q_2$ is brought into a non-conducting state and thus, the voltage boosting circuit 2 is also brought into an oscillating condition.

If the object to be photographed is located within the intermediate zonal distance, a high level signal is produced from the terminal 10b and the electromagnet Mg4 is actuated, whereby the member 27a of the lens driving member 27 is engaged and stopped by a holding member 30 which had been held by the attractive force caused by the permanent magnet core of electromagnet Mg4. Hence, the objective lens assembly 26 is positioned so as to be focused on the object located within the intermediate zonal distance mentioned earlier. In the case of taking photographic pictures of the object located in the intermediate zonal distance as mentioned just above, the transferring movement of the member 22 together with the series of successive operational actuations for the exposure associated with the movement of the member 22 are accomplished in the same manner as described in the foregoing.

When the object to be photographed is located in the for zonal distance, a signal is produced from the terminal 10c. In this case, since neither the electromagnet Mg3 nor the electromagnet Mg4 is energized, the respective levers 29 and 30 are maintained in their attracted positions, and therefore, the member 27a of the lens driving member 27 is transferred until the member 27a is prevented from being further transferred by stopper 31 provided at a fixed position. The objective lens assembly 26 is accordingly appropriately positioned so as to be focused on the object located within the far zonal distance mentioned earlier. The series of operational actuations for the exposure for this case are also accomplished in the same manner as described in the foregoing.

The shutter releasing mechanism and the objective lens driving mechanism are both arranged to be reset to the situation shown in FIG. 3 with the completion of movement of the film advancing lever by a mechanism (not shown) after completion of an exposure as mentioned above.

As a modification of the above mentioned embodiment, switches $S_6'$ and $S_7'$, which are connected in series with each other and arranged to be actuated in the same manner as the switches $S_6$ and $S_7$, respectively, are incorporated in the present circuit, as specifically shown in dotted lines in a FIG. 1, in parallel relationship with the switch $S_1$ which is closed upon the initial depression of the shutter release button (not shown) as described earlier.

By the arrangement described above, even if the shutter release button is released before the termination of an exposure, the voltage from the power source is continuously applied to the automatic exposure control circuit 1 by means of the circuit arrangement mentioned above until the exposure step is fully accomplished.

In the case of taking photographic pictures with the help of the flash, the respective switches $S_3$, $S_4$ and $S_5$ are all changed over to the respective contacts b, wherein since the capacitor $C_2$ (specifically shown in FIG. 2) associated with the flash means (not shown in FIG. 2) is also electrically charged, the speed of electrical charging of the capacitor $C_1$ is naturally decreased as described in the foregoing. Therefore, note that the functional characteristics described in the foregoing with reference to FIG. 1 are applicable to this case. When both capacitor $C_2$ and capacitor $C_1$ are fully charged up to their respective predetermined levels in succession, the collector of the transistor $Q_4$ is brought into a high state.

Furthermore, since the switch $S_5$ has been changed over to the contact b in this case, the exposure time of the camera of the present invention does not depend upon the brightness of the object to be photographed, but the shutter opening is synchronized with the firing of the electronic flash is brought about with the time constant circuit which is constituted by the resistor $R_2$ and the capacitor $C_3$.

According to the present invention, since it is arranged so that the shutter release can be effected only when the conditions for causing the camera to function normally are fully met, both in photographing with the use of a flash and in shooting under natural light conditions without the use of a flash, it is possible for even those unskilled in handling cameras to readily take photographs through mere depression of the shutter release button.

Although the present invention has been fully described by way of example with reference to the accompanying drawings, it note that various changes and modifications are apparent to those skilled in the art. Therefore, unless such changes and modifications otherwise depart from the scope of the present invention, they should be construed as included therein.

What is claimed is:

1. An automatic focus control camera comprising a camera objective lens; driving means for driving said camera objective lens along the optical axis thereof to change the focusing of the same; distance detecting means for generating a distance signal representative of the distance from the camera to an object to be photographed, regardless of the axial position of said camera objective lens; arresting means for arresting said driving means during its operation and determining the axial position of said camera objective lens in accordance with said distance signal; a camera shutter mechanism; shutter release means operable in association with the operation of said driving means for actuating said camera shutter mechanism subsequent to the position determination of said objective lens; actuation means for actuating said driving means; power supply means for supplying electric power to at least said distance detecting means; voltage checker means for generating a first output signal when the voltage of said power supply means is higher than a predetermined level; a manual member for generating a second output signal in response to manual operation thereof; gate means responsive to said first and second output signals for allowing the transmission of said distance signal from said distance detecting means to said arresting means in response to application of both said first and second output signals thereto; and response means responsive to said first and second output signals for actuating said actuation means in response to application of both said first and second output signals thereto.

2. An automatic focus control camera as claimed in claim 1, wherein said driving means includes a drive member movable in a path from a cocked position to an advanced position to drive said camera objective lens from a first extreme position towards a second extreme position; said actuating means comprising an actuating electromagnet to release said drive member from its cocked position; said arresting means includes at least one movable stopper and an electromagnet associated therewith for causing said movable stopper to move into an arresting position in said path of movement of said drive member, and a fixed stopper arranged in said path to engage said drive member when said movable stopper is not actuated; and said shutter release means includes an operating member associated with said drive member so as to be cocked therewith but to move further after said drive member is stopped by said movable or fixed stopper, thereby releasing said camera shutter mechanism.

3. An automatic focus control camera as claimed in claim 2, wherein said actuating electromagnet and said electromagnet associated with said at least one movable stopper each comprise an electromagnetic coil wound on a permanent magnet core, whereby said permanent magnet core holds said corresponding actuating member or movable stopper by magnetic attraction except when said electromagnetic coil is supplied with electric power to generate a magnetic field opposite to the magnetic field of said permanent magnet core.

4. An automatic focus control camera as claimed in claim 2, wherein:
said gate means comprises at least one transistor for supplying electric power to said electromagnet associated with said at least one movable stopper according to said distance signal from said distance detection means upon application of both said first and second output signals to said gate means; and
said response means comprises a transistor for supplying electric power to said actuating electromagnet upon application of both said first and second output signals to said response means.

5. An automatic focus control camera as claimed in claim 1, wherein:
said power supply means comprises a battery and an electric voltage boosting circuit means connected to said battery for generating a boosted voltage signal having a voltage higher than the voltage of said battery and for supplying said boosted voltage signal to at least said distance detecting means; and
said voltage checker means is connected to said electric voltage boosting circuit means for generating said first output signal when the voltage of said boosted voltage signal is higher than said predetermined level.

6. An automatic focus control camera as claimed in claim 1, wherein:
said automatic focus control camera further comprises an electronic flash means; and
said power supply means comprises a battery and an electric voltage boosted circuit means connected to said battery for generating a boosted voltage signal having a voltage higher than the voltage of said battery and for supplying said boosted voltage signal to said electronic flash means.

7. An automatic focus control camera as claimed in claim 6, wherein:
said electric voltage boosting circuit means comprises a first output terminal for supplying electric power to said electronic flash means and a second output terminal for supplying electric power to said distance detecting means; and
said voltage checker means is connected to said second output terminal of said electric voltage boosting circuit means for generating said first output signal when the voltage appearing at said second output terminal of said electric voltage boosting circuit means is higher than said predetermined level, whereby said voltage checker means checks the voltage at said second output terminal and whereby the voltage at said first output terminal is so related to the voltage at said second output terminal that said voltage checker means checks the voltage at said first output terminal by checking the voltage at said second output terminal.

8. An automatic focus control camera as claimed in claim 6, wherein:
said automatic focus control camera further comprises an automatic exposure control circuit means connected to and supplied with electric power from said battery; and
said electric voltage boosting circuit means comprises a first transistor and an oscillation transformer for generating an oscillation signal from the voltage of said battery and for boosting the voltage of said oscillation signal and a second transistor connected to said response means and siad first transistor for disabling said generation of said oscillation signal upon application of both said first and second output signals to said response means.

9. An automatic focus control camera as claimed in claim 8, wherein:
said automatic focus control camera further comprises an interruption switch connected to said camera shutter mechanism and said first transistor of said electric voltage boosting circuit means for disabling said generation of said oscillation signal from the cocking of said camera shutter mechanism until the closure of said camera shutter mechanism.

* * * * *